United States Patent
Shahid et al.

(10) Patent No.: US 11,158,305 B2
(45) Date of Patent: Oct. 26, 2021

(54) ONLINE VERIFICATION OF CUSTOM WAKE WORD

(71) Applicant: Microsoft Technology Licensing, LLC, Redmond, WA (US)

(72) Inventors: Khuram Shahid, Seattle, WA (US); Kshitiz Kumar, Redmond, WA (US); Teng Yi, Kirkland, WA (US); Veljko Miljanic, Bellevue, WA (US); Huaming Wang, Clyde Hill, WA (US); Yifan Gong, Sammamish, WA (US); Hosam Adel Khalil, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 138 days.

(21) Appl. No.: 16/522,401

(22) Filed: Jul. 25, 2019

(65) Prior Publication Data

US 2020/0349925 A1 Nov. 5, 2020

Related U.S. Application Data

(60) Provisional application No. 62/843,541, filed on May 5, 2019.

(51) Int. Cl.
*G10L 15/08* (2006.01)
*G10L 15/22* (2006.01)
(Continued)

(52) U.S. Cl.
CPC .............. *G10L 15/08* (2013.01); *G10L 15/22* (2013.01); *G10L 15/30* (2013.01); *G10L 17/24* (2013.01);
(Continued)

(58) Field of Classification Search
None
See application file for complete search history.

(56) References Cited

U.S. PATENT DOCUMENTS 6,272,463 B1 * 8/2001 Lapere .................. G10L 15/065
704/243
8,719,039 B1 5/2014 Sharifi
(Continued)

FOREIGN PATENT DOCUMENTS

EP 3321930 A1 5/2018
WO 2014035394 A1 3/2014

OTHER PUBLICATIONS

Graves, Alex, "Sequence transduction with Recurrent Neural Networks", In Repository of arXiv:1211.3711, Nov. 14, 2012, 9 Pages.
(Continued)

*Primary Examiner* — Neeraj Sharma
(74) *Attorney, Agent, or Firm* — Schwegman Lundberg & Woessner, P.A.

(57) ABSTRACT

Generally discussed herein are devices, systems, and methods for wake word verification. A method can include receiving, at a server, a message from a device indicating that an utterance of a user-defined wake word was detected at the device, the message including (a) audio samples or features extracted from the audio samples and (b) data indicating the user-defined wake word, retrieving or generating, at the server, a custom decoding graph for the user-defined wake word, wherein the decoding graph and the static portion of the wake word verification model form a custom wake word verification model for the user-defined wake word, executing the wake word verification model to determine a likelihood that the wake word was uttered, and providing a message to the device indicating whether wake was uttered based on the determined likelihood.

14 Claims, 10 Drawing Sheets

(51) Int. Cl.
*G10L 17/24* (2013.01)
*G10L 15/30* (2013.01)
(52) U.S. Cl.
CPC .. *G10L 2015/088* (2013.01); *G10L 2015/223* (2013.01)

(56) References Cited

U.S. PATENT DOCUMENTS

| | | | |
|---|---|---|---|
| 9,263,042 B1 | 2/2016 | Sharifi | |
| 9,275,637 B1 | 3/2016 | Salvador et al. | |
| 9,697,828 B1 | 7/2017 | Prasad et al. | |
| 2013/0339028 A1* | 12/2013 | Rosner | H04R 29/004 704/275 |
| 2014/0012586 A1* | 1/2014 | Rubin | G06F 21/32 704/273 |
| 2014/0278390 A1* | 9/2014 | Kingsbury | G10L 25/54 704/232 |
| 2015/0154953 A1 | 6/2015 | Bapat et al. | |
| 2015/0243275 A1 | 8/2015 | Luan et al. | |
| 2016/0180838 A1* | 6/2016 | Parada San Martin | G06N 3/02 704/232 |
| 2016/0328949 A1 | 11/2016 | Zhong | |
| 2017/0025125 A1* | 1/2017 | Alvarez Guevara | G10L 17/04 |
| 2017/0148429 A1* | 5/2017 | Hayakawa | G10L 15/02 |
| 2018/0018973 A1* | 1/2018 | Moreno | G10L 17/14 |
| 2018/0158449 A1 | 6/2018 | Tang | |
| 2018/0303472 A1 | 10/2018 | Lopez Moreno et al. | |
| 2019/0027138 A1 | 1/2019 | Wang et al. | |
| 2019/0051299 A1 | 2/2019 | Ossowski et al. | |
| 2019/0115011 A1* | 4/2019 | Khellah | G10L 15/02 |
| 2019/0164538 A1* | 5/2019 | Seo | G10L 15/285 |
| 2019/0362711 A1* | 11/2019 | Nosrati | G06N 20/10 |
| 2020/0027444 A1 | 1/2020 | Prabhavalkar et al. | |
| 2020/0273449 A1* | 8/2020 | Kumar | G06F 16/353 |
| 2020/0349924 A1 | 11/2020 | Stoimenov et al. | |
| 2020/0349927 A1 | 11/2020 | Stoimenov et al. | |
| 2021/0055778 A1* | 2/2021 | Myer | G06F 3/167 |

OTHER PUBLICATIONS

He, et al., "Streaming Small-Footprint keyword Spotting using Sequence-to-Sequence Models", In Repository of arXiv:1710.09617, Oct. 26, 2017, 8 Pages.

Boo et al., "On-Device End-to-end Speech Recognition with Multi-Step Parallel Rnns", In IEEE Spoken Language Technology Workshop (SLT), Dec. 18, 2018, pp. 376-381.

Kepuska et al., "Improving Wake-Up-Word and General Speech Recognition Systems", In IEEE 15th Intl Conf on Dependable, Autonomic and Secure Computing, 15th Intl Conf on Pervasive Intelligence and Computing, 3rd Intl Conf on Big Data Intelligence and Computing and Cyber Science and Technology Congress(DASC/PiCom/DataCom/CyberSciTech), Nov. 6, 2017, pp. 318-321.

"International Search Report and Written Opinion Issued in PCT Application No. PCT/US2020/024523", dated May 28, 2020, 15 Pages.

Cutler, et al., "Patterns of English Phoneme Confusions by Native and Non-Native Listeners", In the Journal of the Acoustical Society of America, vol. 116, Issue 6, Dec. 2004, pp. 3668-3678.

Miller, et al., "An Analysis of Perceptual Confusions among some English Consonants", In the Journal of the Acoustical Society of America, vol. 27, Issue 2, Mar. 1955, 1 Page.

Quazi, et al., "System Combination Architecture & Plan", Retrieved From: https://speechwiki.azurewebsites.net/architecture/system-combination-architecture.html, May 6, 2019, 2 Pages.

Wells, et al., "Create a Custom Wake Word by Using the Speech Service", Retrieved From: https://docs.microsoft.com/en-us/azure/cognitive-services/speech-service/speech-devices-sdk-create-kws, Jul. 5, 2019, 4 Pages.

Wells, et al., "Quickstart: Run the Speech Devices SDK Sample App on Android", Retrieved From: https://docs.microsoft.com/en-us/azure/cognitive-services/Speech-Service/speech-devices-sdk-android-quickstart, Jul. 5, 2019, 11 Pages.

Wen, et al., "Cortana SDK 2nd Pass Keyword Spotter (KWS)", Retrieved From: https://speechwiki.azurewebsites.net/architecture/cortana-sdk-2nd-pass-keyword-spotter.html, May 6, 2019, 5 Pages.

"Phone (phonetics),"Retrieved From: https://web.archive.org/web/20190527000131/https://en.wikipedia.org/wiki/Phone_(phonetics), May 27, 2019, 2 Pages.

"International Search Report & Written Opinion issued in PCT Application No. PCT/US20/024525", dated Jul. 30, 2020, 17 Pages.

"International Search Report & Written Opinion issued in PCT Application No. PCT/US20/025086", dated Jul. 6, 2020, 13 Pages.

"Non Final Office Action issued in U.S. Appl. No. 16/522,427", dated Mar. 25, 2021, 28 Pages.

Karanasou, P., "Phonemic Variability and Confusability in Pronunciation Modeling for Automatic Speech Recognition", In Doctoral Thesis of Paris-South University, Paris-SUD Doctoral School of Computing, Jun. 11, 2013, 121 Pages.

Vilares, M., et al., "Phrase Similarity through the Edit Distance", In Proceedings of International Conference on Database and Expert Systems Applications, Aug. 30, 2004, pp. 306-317.

"Non Final Office Action Issued in U.S. Appl. No. 16/522,416", dated Feb. 17, 2021, 13 Pages.

* cited by examiner $$\underset{610}{\begin{bmatrix} a_{11} & \cdots & a_{1n} \\ \vdots & \ddots & \vdots \\ a_{m1} & \cdots & a_{mn} \end{bmatrix}} = \underbrace{\begin{bmatrix} u_{11} & \cdots & u_{1n} \\ \vdots & \ddots & \vdots \\ u_{m1} & \cdots & u_{mn} \end{bmatrix} \cdot \begin{bmatrix} \varepsilon_{11} & \cdots & 0 & \cdots & 0 \\ \vdots & \ddots & \vdots & \ddots & \vdots \\ 0 & \cdots & \varepsilon_{kk} & \cdots & 0 \\ \vdots & \ddots & \vdots & \ddots & \vdots \\ 0 & \cdots & 0 & \cdots & \varepsilon_{nn} \end{bmatrix} \begin{bmatrix} v_{11} & \cdots & v_{1n} \\ \vdots & \ddots & \vdots \\ v_{m1} & \cdots & v_{mn} \end{bmatrix}}_{620}$$

$$\approx \underbrace{\begin{bmatrix} u_{11} & \cdots & u_{1n} \\ \vdots & \ddots & \vdots \\ u_{m1} & \cdots & u_{mn} \end{bmatrix} \cdot \begin{bmatrix} \varepsilon_{11} & \cdots & 0 & \cdots & 0 \\ \vdots & \ddots & \vdots & \ddots & \vdots \\ 0 & \cdots & \varepsilon_{kk} & \cdots & 0 \\ \vdots & \ddots & \vdots & \ddots & \vdots \\ 0 & \cdots & 0 & \cdots & 0 \end{bmatrix} \cdot \begin{bmatrix} v_{11} & \cdots & v_{1n} \\ \vdots & \ddots & \vdots \\ v_{m1} & \cdots & v_{mn} \end{bmatrix}}_{630}$$

$$= \underbrace{\begin{bmatrix} u_{11} & \cdots & u_{1n} \\ \vdots & \ddots & \vdots \\ u_{m1} & \cdots & u_{mn} \end{bmatrix} \cdot \begin{bmatrix} \varepsilon_{11} & \cdots & 0 \\ \vdots & \ddots & \vdots \\ 0 & \cdots & \varepsilon_{kk} \end{bmatrix} \cdot \begin{bmatrix} v_{11} & \cdots & v_{1n} \\ \vdots & \ddots & \vdots \\ v_{m1} & \cdots & v_{mn} \end{bmatrix}}_{640}$$

$$= \underbrace{\begin{bmatrix} u_{11} & \cdots & u_{1n} \\ \vdots & \ddots & \vdots \\ u_{m1} & \cdots & u_{mn} \end{bmatrix} \cdot \begin{bmatrix} w_{11} & \cdots & w_{1n} \\ \vdots & \ddots & \vdots \\ w_{m1} & \cdots & w_{mn} \end{bmatrix}}_{650}$$

*FIG. 5*

ONLINE VERIFICATION OF CUSTOM WAKE WORD

RELATED APPLICATION

This application claims the benefit of priority to U.S. Provisional Patent Application Ser. No. 62/843,541, filed on May 5, 2019, and titled "Online Verification of Custom Wake Word", which is incorporated herein by reference in its entirety.

BACKGROUND

The use of automatic personal assistants has grown significantly. A personal digital assistant is an application or service that retrieves information, executes a task, or initiates execution of a task on behalf of a user, sometimes after a device detects that a user has uttered a wake word. Users can communicate with such personal digital assistants using a conversational interface, such as a microphone and speaker.

SUMMARY

The following presents a shortened summary of various aspects of this disclosure in order to provide a basic understanding of such aspects. This summary is not an extensive overview of all contemplated aspects and is intended to neither identify key or critical elements nor delineate the scope of such aspects. Its purpose is to present some concepts of this disclosure in a compact form as a prelude to the more detailed description that is presented later.

In one aspect of the present disclosure, systems and methods are disclosed for verifying a wake word is present in an audio clip. In one instance, a system can include a memory including model parameters that define a wake word verification model, and processing circuitry to receive a message from a device indicating that an utterance of a wake word was detected at the device, the message including audio samples or features extracted from the audio samples and data indicating the wake word, execute wake word verification model to determine a likelihood that the wake word was uttered, and provide a message to the device indicating whether wake was uttered based on the determined likelihood.

The wake word verification model can include a prediction network that includes a decoding graph for only the wake word and a background language model (BLM). The wake word can be one of a plurality of wake words for the device and the decoding graph includes only the plurality of wake words and alternate pronunciations thereof. The wake word verification model can further include a general acoustic model that operates on the audio samples or the features extracted from the audio samples to predict a series of phonemes corresponding thereto.

The acoustic model can include a plurality of neural network layers quantized to either 8 or 16-bits. The acoustic model can further include, wherein an input neural network layer and an output neural network layer of the neural network layers are quantized to 16-bits and the remaining neural network layers are quantized to 8-bits. The wake word verification model further includes a beam search decoder to determine, based on the predicated series of phonemes and a union of an output of the decoding graph and the BLM, a confidence that the wake word was uttered. The wake word verification model can further determine that the wake word is present only in response to determining that the wake word was predicted to be uttered based on at least one or two intermediate hypotheses in at least two frames since the last silence. One occurrence of the wake word in an intermediate hypothesis works well, but looking for at least two occurrences in the intermediate hypotheses reduces false acceptances (FAs). The processing circuitry can further determine, in parallel, a task present in the audio samples or features extracted from the audio samples.

BRIEF DESCRIPTION OF DRAWINGS

FIG. 5 illustrates, by way of example, a flow diagram of a decomposition of a weight matrix of a neural network (NN) model into two matrices with smaller dimensions.

DETAILED DESCRIPTION

Figure 1:
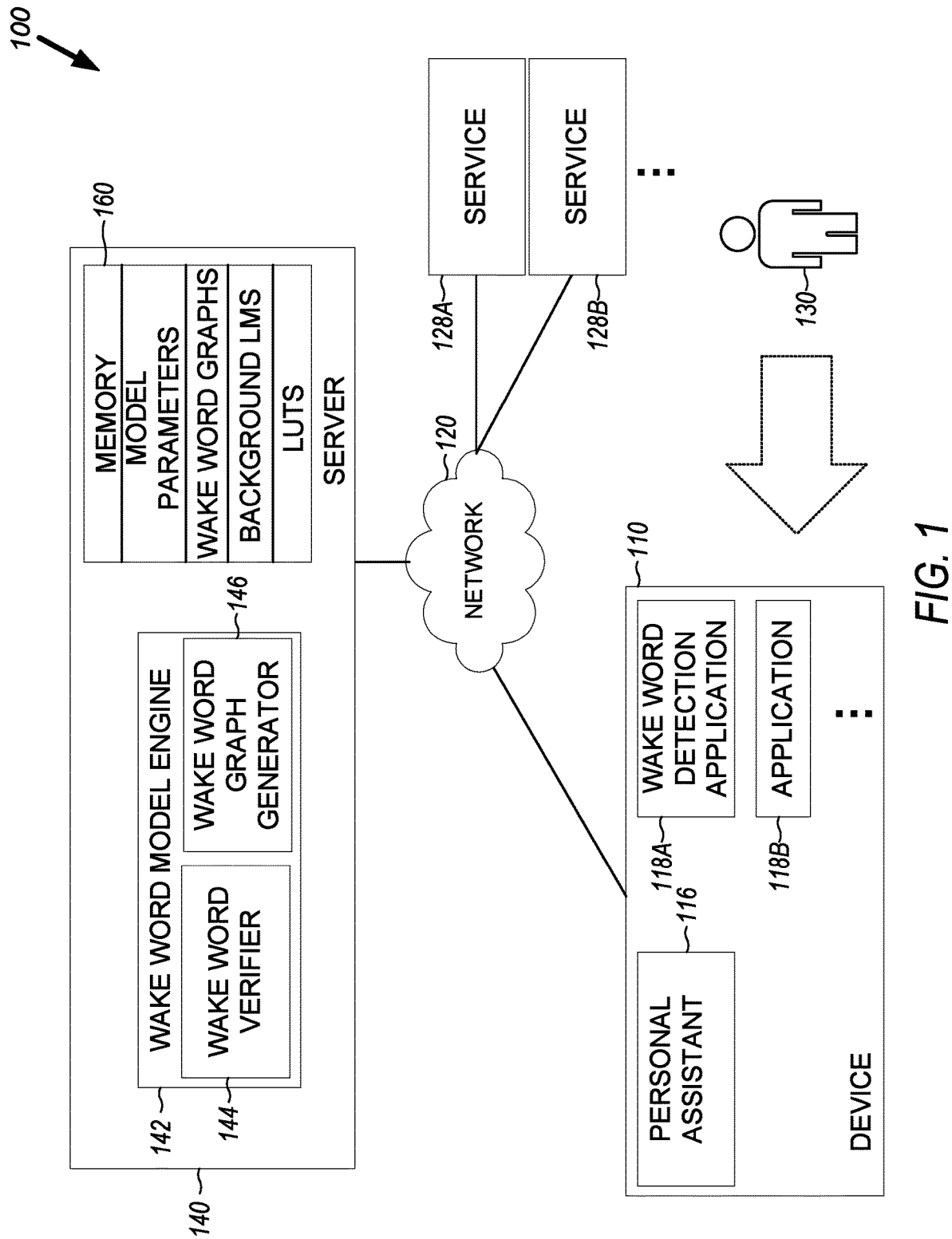
FIG. 1 illustrates, by way of example, a logical block diagram of an embodiment of a system.

Aspects and implementations of the present disclosure are directed to verifying whether a custom (user chosen) wake word was uttered in an audio clip. The custom wake word can be detected in the audio clip, such as on a first device, and then provided to another device for verification. The first device can be a memory or processing bandwidth limited device. The other device can be part of a service or a same or different network.

Intelligent personal assistants and related technologies can enable a user to obtain information, execute tasks, and perform other activities. Users can interact with or control such personal assistants via conversational interfaces such as messaging, chat, audio commands, etc. To access a personal assistant, a wake word is typically required. A wake word is a word or phrase that indicates, to the personal assistant, that the user is asking the personal assistant to perform a task. Wake words are typically static and pre-programmed into a personal assistant. For example, Microsoft® Corporation of Redmond, Wash., United States, has a personal assistant that can be accessed using the phrase "Hey Cortana". However, some people may not like the phrase, may use the word "Cortana" commonly in reference to something other than the personal assistant, thus confusing the personal assistant, or may otherwise want to choose their own wake word for accessing the personal assistant. Such user-chosen wake words are called "custom wake words" herein.

However, detecting a custom wake word is challenging for a number of reasons. One is that a model for detecting the wake word on a device may not be as accurate as desired. The model can confuse words that are not the wake word for the wake word (sometimes called False Activations (FA)). Sometimes, the model can miss an instance of the wake word (reducing a Correct Activation (CA) rate). Embodiments herein can provide verification of whether an audio clip from a device includes a custom wake word. The verification can be low latency.

To increase the CA and reduce the FA, while reducing the compute and power requirements for the end device, it is common to use a multi-step system. In the multi-step system, a device can determine if the wake word is present. An audio clip determined, by the device, to include the wake word can then be provided to a verification service. In the multi-step system, the on-device stage can produce false positives more often than a user would like. The verification service can be accessed in the cloud. If verification succeeds, the user interaction is confirmed and processed by the device. If the verification fails, the interaction is ignored by the device.

Usually, if verification passes, the cloud service will identify a task in the audio associated with the wake word. The identified task can then be provided to the device.

Service side verification is currently performed for specific pre-determined wake words (e.g., "Cortana") and involves wake word-specific specialized work. Embodiments provide an ability to verify runtime-configured wake words. Embodiments can leverage a generalized speech recognition (SR) model and that is easily customized to the task of wake word verification instead of SR.

Recent successful techniques for wake word detection focus on small static models trained from millions of variations of a single wake word spoken in different acoustic environments, in different language contexts, and by people of different genders and accents. Embodiments herein employ a high-accuracy machine learning (ML) technique that does not need wake word-specific training.

Wake word activation can be an important part of voice interfaces (such as a personal assistant). Advances in wake word activation focus on training low-complexity models (e.g., models that consume small amounts of memory or processing circuitry bandwidth) that detect an utterance of a predetermined static wake word. The prior pretrained models require large amounts of wake word samples and training to be effective. Embodiments herein provide a system capable of detecting custom user-defined wake words, such as on memory or processing bandwidth limited devices. The models for detection of such custom wake words can be difficult or impossible to build due to either data sparsity, computational demands for training, or both.

Unlike static wake word-dependent models, embodiments include an efficient model, trained from readily available general-purpose speech data, that can be tailored to recognize a user-defined wake word without retraining. A customization of the model can take place as part of the system setup before deployment. The customization can include a customized decoding graph that decodes for the wake word.

Embodiments herein do not need such specialized training. Instead, embodiments include a general acoustic model (AM) and language model (LM) or something that performs operations of the AM and LM (e.g., a recurrent neural network transducer (RNN-T)). Embodiments can help detect a custom wake word using a decoding graph that is customized to the wake word. A decoder can receive the output from the AM, LM, and decoding graph to determine whether it is likely that the custom wake word was uttered.

One or more operations can be performed on the acoustic model (AM) of a custom wake word detector to reduce its size. Such operations can include a singular value decomposition (SVD) or quantization. The AM can be used in conjunction with an adaptable background language model (BLM) and wake word graph. Embodiments with such structures can provide a high CA and low FA custom wake word detection system.

Accordingly, described herein in various implementations are technologies, including methods, machine-readable mediums, and systems, that enable low latency verification of one or more custom wake words.

It can therefore be appreciated that the described technologies are directed to and address specific technical challenges and longstanding deficiencies in multiple technical areas, including but not limited to communication interfaces, semantic relationships, and personal digital assistants. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

FIG. 1 illustrates, by way of example, a diagram of an embodiment of a system 100. As shown, the system 100 includes device 110 which can be a laptop computer, a desktop computer, a terminal, a mobile phone, a tablet computer, a smart watch, a digital music player, a server, a smart speaker, and the like. User 130 can be a human user who interacts with device 110. For example, user 130 can provide various inputs (e.g., via an input device/interface such as a keyboard, mouse, touchscreen, microphone, etc.) to device 110. Device 110 can also display, project, and/or otherwise provide content to user 130 (e.g., via output components such as a screen, speaker, etc.).

As shown in FIG. 1, device 110 can include personal assistant 116. Personal assistant 116 can be an application or module that configures/enables the device 110 to interact with, provide content to, and/or otherwise perform operations on behalf of user 130. For example, personal assistant 116 can receive communications and/or request(s) from user 130 and present/provide responses to such request(s) (e.g., within a conversational or 'chat' interface). In certain implementations, personal assistant 116 can also identify content that can be relevant to user 130 (e.g., based on a location of the user or other such context) and present such content to the user. Personal assistant 116 can also enable user 130 to initiate and/or configure other application(s) (e.g., application 118A, as described below). For example, personal assistant 116 can initiate an application (e.g., a media player application, a web search application, a navigation application, or the like) that fulfills a request provided by the user. Personal assistant 116 can also initiate and/or perform various other operations, such as are described herein.

Figure 10:
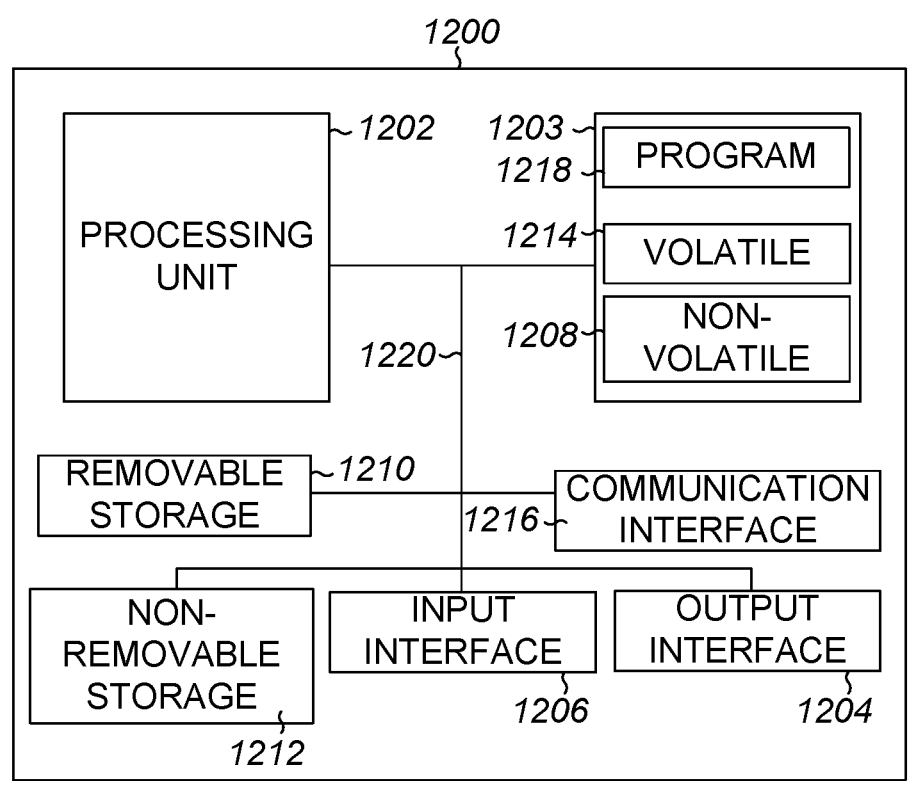
FIG. 10 illustrates, by way of example, a block diagram of an embodiment of a machine (e.g., a computer system) to implement one or more embodiments.

As shown in FIG. 1, device 110 can also include various applications, programs, modules, etc., such as wake word detection application 118A and application 118B. The referenced applications can be stored in memory of device 110 (e.g., memory 1203 as depicted in FIG. 10 and described below). One or more processor(s) of device 110 (e.g., processing unit 1202 as depicted in FIG. 10 and described below), sometimes called processing circuitry, can execute such application(s). In doing so, device 110 can be configured to perform various operations, present content to user 130, etc. Examples of such applications include but are not limited to: social media/messaging applications, applications that facilitate transactions (e.g., food purchases), among many others.

It should also be noted that while various components (e.g., personal assistant 116, application 118B, etc.) are depicted (e.g., in FIG. 1) as operating on device 110, this is only for the sake of clarity. However, in other implementations the referenced components (e.g., application 118B) can also be implemented on other devices/machines. For example, in lieu of executing locally at device 110, application 118B (e.g., a ride-sharing application) can be implemented remotely (e.g., on a server device or within a cloud service or framework).

As also shown in FIG. 1, device 110 can connect to and/or otherwise communicate with server 140 via network 120. Network 120 can include one or more networks such as the Internet, a wide area network (WAN), a local area network (LAN), a virtual private network (VPN), an intranet, and the like.

Server 140 can be, for example, a server computer, computing device, storage service (e.g., a 'cloud' service), etc., and can include wake word model engine 142 and memory 160. The wake word model engine 142 can execute an application thereof (e.g., the wake word verifier 144) using processing circuitry (e.g., processing unit 1202 as depicted in FIG. 10 and described below).

The wake word model engine 142 can include an application or module that configures/enables server 140 to perform various operations such as are described herein. For example, wake word model engine 142 can configure/enable server 140 to receive a message indicating a requested wake word was detected, such as from the device 110. The message can be received through the network 120. The wake word model engine 142 can verify whether the wake word is present in an audio clip of the message, such as by using the wake word verifier 144.

Unlike static wake word-dependent models, embodiments include an efficient model, trained from readily available general-purpose speech data, that can be tailored to recognize a user-defined wake word without retraining. A customization of the model can take place as part of the system setup before deployment. The customization can be performed by the wake word model engine 142 with input from the device 110.

The device 110 can provide a message to the server 140, such as through a web portal connected to the server 140. The message can indicate that the wake word was detected in audio, such as by the wake word detection application 118A. The server 140 can execute the wake word verifier 144 to determine whether the wake word was uttered in the audio. The wake word verifier 144 can optionally identify or determine alternative plausible pronunciations for the wake word. The alternative plausible pronunciations can be included in the wake word graphs of the memory 160.

The server 140 can execute a wake word graph generator 146. The wake word graph generated by the wake word decode graph generator 146 can optionally decode alternative plausible pronunciations for the wake word. The alternative plausible pronunciations can be included in the wake word graph.

The background LMs of the memory 160 can include a pruned or unpruned version of a pre-existing background LM (BLM). Pruning can remove the wake word (and alternative pronunciations) therefrom. The BLM can include an n-gram language model, where n is an integer greater than zero (0). If the BLM is static, no changes are made between deployments. If the BLM is dynamic, the wake word and pronunciations thereof can be removed therefrom.

Figure 2:
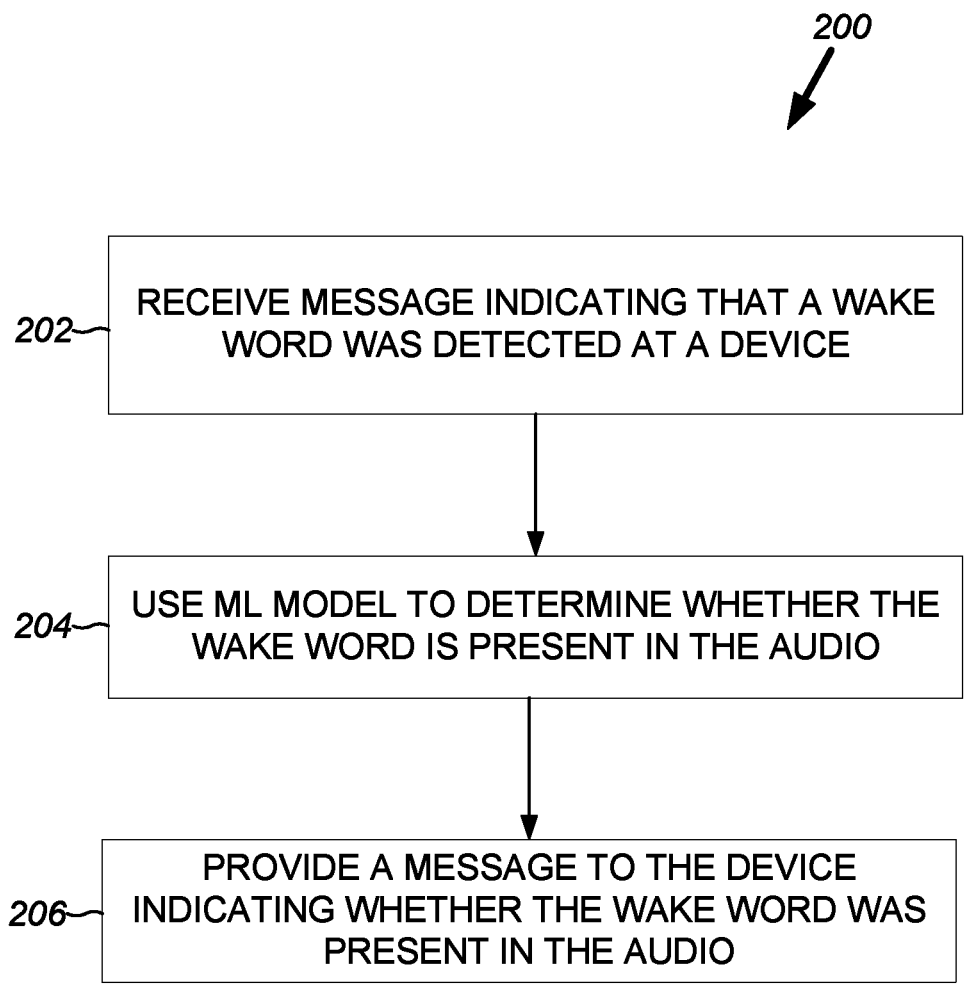
FIG. 2 illustrates, by way of example, a flow diagram of an embodiment of a method for wake word verification.

FIG. 2 illustrates, by way of example, a diagram of an embodiment of a method 200 for wake word verification. The method 200 as illustrated includes receiving a first message indicating that a custom wake word was detected at the device 110, at operation 202; operating, using an ML model, on audio (samples of audio or features of audio), to determine whether the custom wake word is present in the audio, at operation 204; and providing a second message to the device 110 indicating whether the custom wake word was present in the audio, at operation 206. The first message can include an indication (e.g., index) of the custom wake word to be detected. The index can point to a decoding graph (wake word graph) in the memory 160 corresponding to the custom wake word. The ML model that operates on the audio can operate using the decoding graph indicated by the message. The message can include an audio clip (sampled audio or features of the audio determined by a feature extractor of the model of the device 110). The ML model can use the audio clip as input to determine whether the custom wake word was uttered.

The method 200 can further include, wherein the custom wake word verification model includes a prediction network that includes a decoding graph that decodes for only the custom wake word and a background language model (BLM). The method 200 can further include, wherein the custom wake word is one of a plurality of wake words for the device and the decoding graph includes only the plurality of wake words and alternate pronunciations thereof. The method 200 can further include, wherein the custom wake word verification model further includes a general acoustic model (AM) that operates on the audio samples or the features extracted from the audio samples to predict a series of phonemes corresponding thereto.

The method 200 can further include, wherein the AM includes a plurality of neural network layers quantized to either 8-bits or 16-bits. The method 200 can further include, wherein an input neural network layer and an output neural network layer of the neural network layers of the AM are quantized to 16-bits and the remaining neural network layers are quantized to 8-bits. The method 200 can further include, wherein the custom wake word verification model further includes a beam search decoder to determine, based on the predicated series of phonemes and a union of an output of the decoding graph and the BLM, a confidence that the custom wake word was uttered.

The method 200 can further include, wherein the custom wake word verification model is to determine that the custom wake word is present only in response to determining that the custom wake word was predicted to be uttered in at least two frames since the last silence. The method 200 can further include determining, in parallel, a task present in the audio samples or features extracted from the audio samples.

Figure 3:
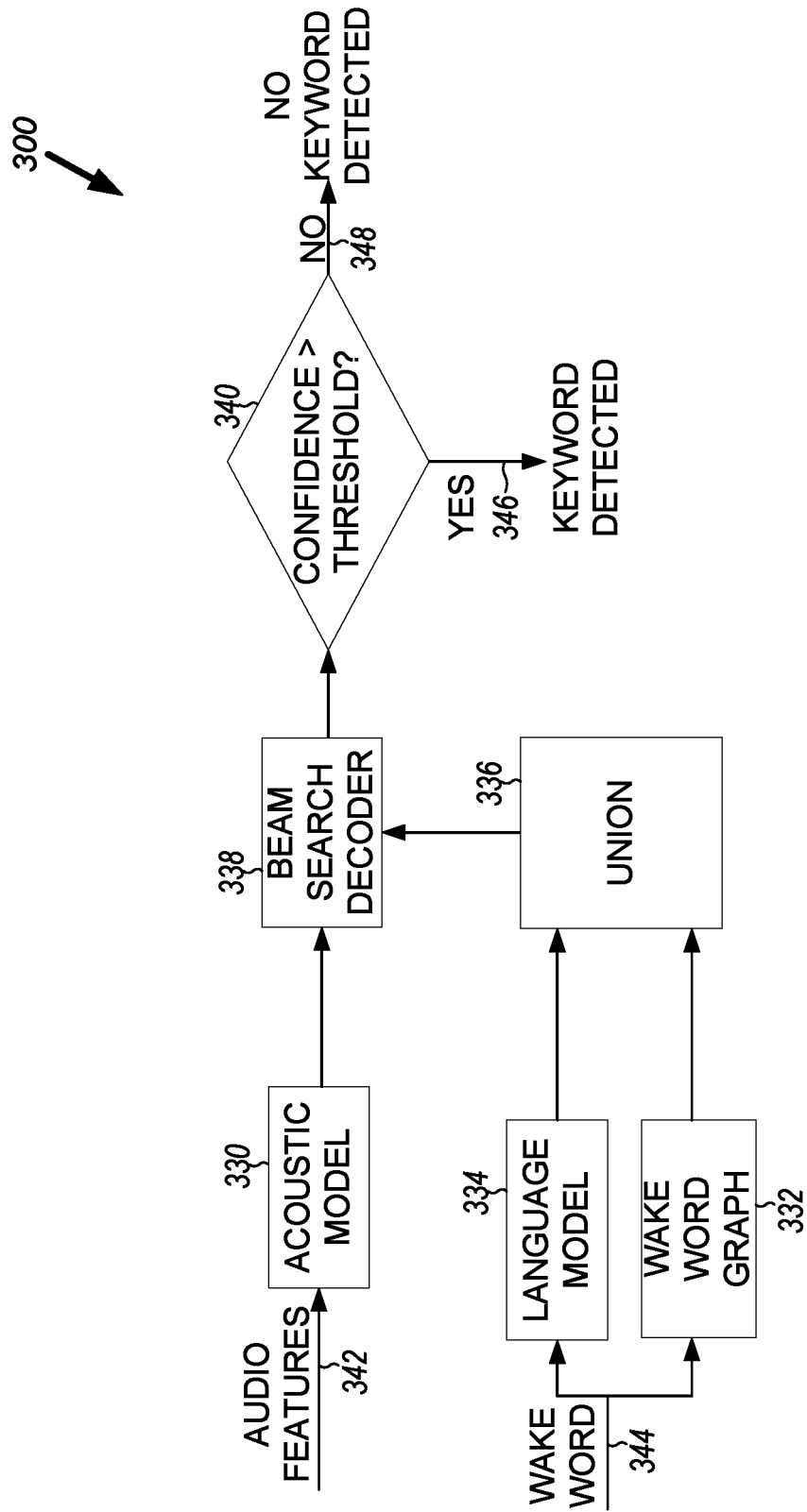
FIG. 3 illustrates, by way of example a logical block diagram of an embodiment of a system for verifying whether the wake word was uttered.

FIG. 3 illustrates, by way of example a diagram of an embodiment of a system 300 for verifying whether the custom wake word was uttered. The system 300 can be implemented by the wake word model engine 142, such as using the wake word verifier 144. The system 300 operates to verify whether the audio (from which audio features 342 are extracted) includes an utterance of a wake word 344.

The system 300 can include at least one static component and at least one dynamic component. The static component can include an acoustic model (AM) 330. The AM 330 can be compressed or otherwise configured for efficient operation in a number of ways, including at least one of (1) NN layer quantization; (2) frame skipping; (3) frame stacking; (4) single value decomposition (SVD); and (5) frame batching. Each of these is discussed elsewhere herein. A confidence classifier (part of a beam search decoder 338) can be static. The confidence classifier can be used to assign a score that, based on a score value relative to a threshold, determines whether the audio includes an utterance of the wake word. NN layer quantization, SVD, frame skipping, frame stacking, and frame batching are discussed with regard to FIGS. and elsewhere herein.

The system 300 as illustrated includes an AM 330, a beam search decoder 338, a background LM 334, a decoding graph 332, and a confidence threshold check at operation 340. The AM 330 is used in SR to represent A relationship between an audio signal (features of an audio signal) and phonemes or other linguistic units that make up speech. The AM 330 is learned from a set of audio recordings or their corresponding transcripts. In some embodiments, the AM 330 can include a recurrent neural network (RNN) trained using a connectionist temporal classification (CTC) neural network (NN). CTC refers to outputs and scoring and is independent of underlying NN structure. The RNN can include long short-term memory (LSTM) units.

CTC is particularly useful when there are more observations than labels. CTC is a technique for modeling a conditional probability distribution over sequence data when frame-level alignments of the target label sequence are unknown. CTC augments the set of output targets with an additional symbol, referred to as the blank symbol. CTC models the output probability of the target sequence conditioned on the input by marginalizing over all possible frame-level alignments, where each output label is assumed to be independent of the other labels, conditioned on the input.

The CTC generates a continuous output that is trained to model the probability of the label. The CTC output can be backpropagated to update the NN weights. Alternatively, a hidden Markov model (HMM) can be used in place of the CTC. The AM 330 can receive audio features 342 and produce a series of likelihood vectors that the audio features 342 correspond to phonemes.

The phonemes can include standard phonemes, such as 40 or 44 standard phonemes. The phonemes can include whole word phonemes. Training the AM 330 using the standard phonemes and the whole word phonemes can help a model better recognize the words associated with the whole word phonemes.

Consider an audio data set that includes a large number of utterances of the word "x box". An ML technique trained on this audio can bias the phoneme "/b/" to the pronunciation in the word "box". This can be problematic for a wake word of "BMW", "beamer", or the like, that includes a different pronunciation of the phoneme. The NN can have trouble in detecting the "bee" sound when it is trained using an overwhelming number of words with the "bah" sound. For the word "one", the traditional phoneme sequence is "w aa n". The whole word phoneme sequence can be "w ONE1 ONE2 n". The phones "ONE1" and "ONE2" are specific phones used only for the word "one". In this way, the model can learn the phonemes for the word "one" better.

A whole word phoneme is a symbol dedicated to representing a single word and the possible multiple pronunciations thereof. The whole word phoneme can be appended to the standard phoneme set and used to train the NN. The wake word, a numerical digit (e.g., "one", "two", "three", etc.), or other word can be assigned a whole word phoneme. Consider the word "box". A phoneme deconstruction of the word "box" can be "/b/a/ks/". Instead of training the NN using this phoneme deconstruction, the symbol, @, can be replace each phoneme in the deconstruction and the NN can be trained based on "/@_1/@_2/@/_3/". This removes bias towards the pronunciation of each of the phonemes in "box" and biases the NN towards recognition of the word "box".

The LM 334 can determine a probability of observing an $i^{th}$ gram based on a context history of the preceding n−1 grams, where n is the number of grams in the technique. The LM 334 can be trained using any words of a dictionary or all words of the dictionary minus the wake word(s). In removing the wake word, the wake word can be pruned from the LM 334. In some embodiments, the LM 334 can be a unigram LM, such as to save execution time and memory overhead.

Figure 9:
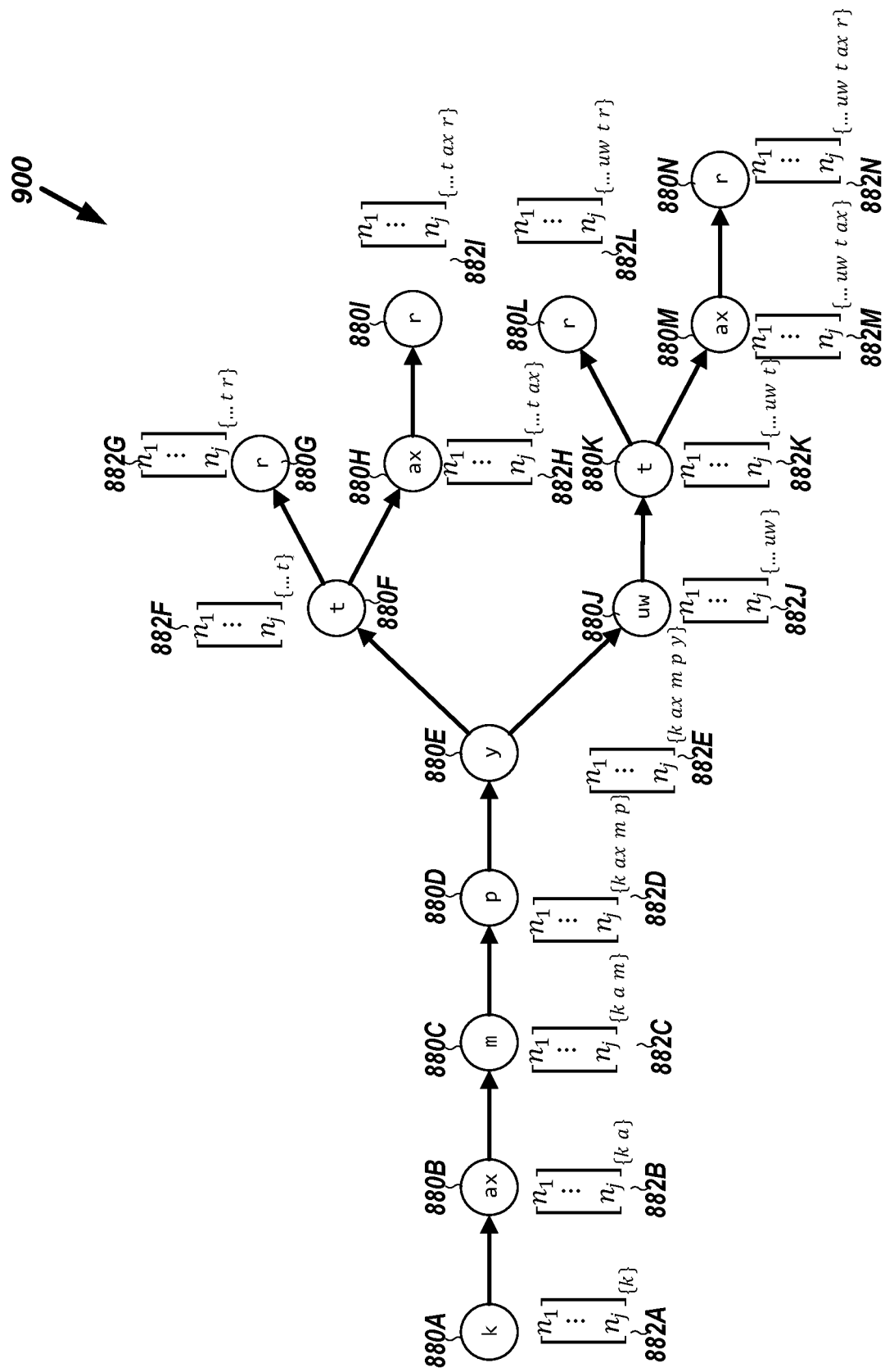
FIG. 9 illustrates, by way of example, a flow diagram of an embodiment of a beam search decoding trie for the word "computer".

The decoding graph 332 indicates the sequence of phonemes in the wake word by a directed graph or a trie (see FIG. 9). Using the decoding graph 332, a next phoneme of the wake word can be determined based on the current location in the wake word graph 332.

The wake word graph 332 is a dynamic component. The wake word graph 332 can include a phoneme graph of a wake word 344 that, when traversed indicates that the wake word 344 has been uttered. The wake word graph 332 can account for different pronunciations of the same word or even for multiple wake words. The wake word graph 332 can begin with a blank (silence) phoneme so that the wake word 344 is only detected following silence or as uttered at a beginning of a phrase.

A union operation 336 can include retaining a specified number of results from the LM 334 and the wake word graph 332. These results can then be provided to the beam search decoder 338.

The beam search decoder 338 receives the output from the acoustic model 330, the LM 334 and the decoding graph 332 to determine a likelihood that the audio features 342 correspond to an utterance of the wake word 344. The beam search decoder 338 can include low probability hypotheses pruned from a search space. The low probability hypotheses include probabilities below a specified threshold. Using the beam-search decoder 338, a maximum number (e.g., 10, 25, 50, 100, more or fewer candidates, or some number therebetween) of scoring candidates can be retained at each decoding step.

The beam search decoder 338 implements a heuristic search algorithm that explores a graph by expanding the most promising node in a limited set. Beam search is an optimization of best-first search that reduces its memory requirements. Best-first search is a graph search which orders all partial solutions according to some heuristic. But in beam search, only a predetermined number of best partial solutions are kept as candidates.

The beam search decoder 338 can be implemented as a token-passing decoder operating on a graph of possible pronunciation hypotheses (e.g., the wake word graph 332). The wake word graph 332 can be structured as a trie, where possible prefixes are merged. Merging the prefixes can conserve memory space. Each node of the trie can represent a pronunciation prefix. The trie can include a prediction network output for that prefix. An example of such a trie is provided in FIG. 9. When the beam search decoder 338 explores the wake word graph 332, it can look up the prediction network outputs stored in those nodes based on output from the AM 330. FIG. 9 illustrates a diagram of such a trie.

A probability vector output from the beam search decoder 338 can be compared to a confidence threshold at operation 340. The confidence threshold can be set by the user 130, such as to be more or less sensitive to detection of the wake word 344. A higher confidence threshold will have fewer false acceptances (FAs) and Cas while a lower confidence threshold will have more FAs and CAs. If an entry in the beam search decoder 338 corresponding to the wake word is greater than a threshold, the keyword can be detected at operation 346. If the entry in the beam search decoder 338 corresponding to the wake word is not greater than the threshold, the keyword is not detected at operation 348.

In some embodiments, a single keyword detection is insufficient to indicate the wake word was uttered. This is, at least in part, because an output of the beam search decoder 338 can change paths mid-audio. This is, at least in part, because the probabilities of what is predicted as being in the phonemes of the audio can depend on what has been said before. By waiting until a specified number of detections (since a last start symbol) is indicated by the operation 340, fewer FAs can be triggered.

Output from the beam search decoder 338 can be provided in a streaming fashion. The output can include a start character, generally indicated by detected silence. The output can then, for each frame, determine phonemes in all the frames from the start up to the current frame, includes audio of a phoneme and generate a string corresponding thereto. The keyword can be detected at operation 346 if two predictions from the last start symbol include the wake word 344.

Figure 4:
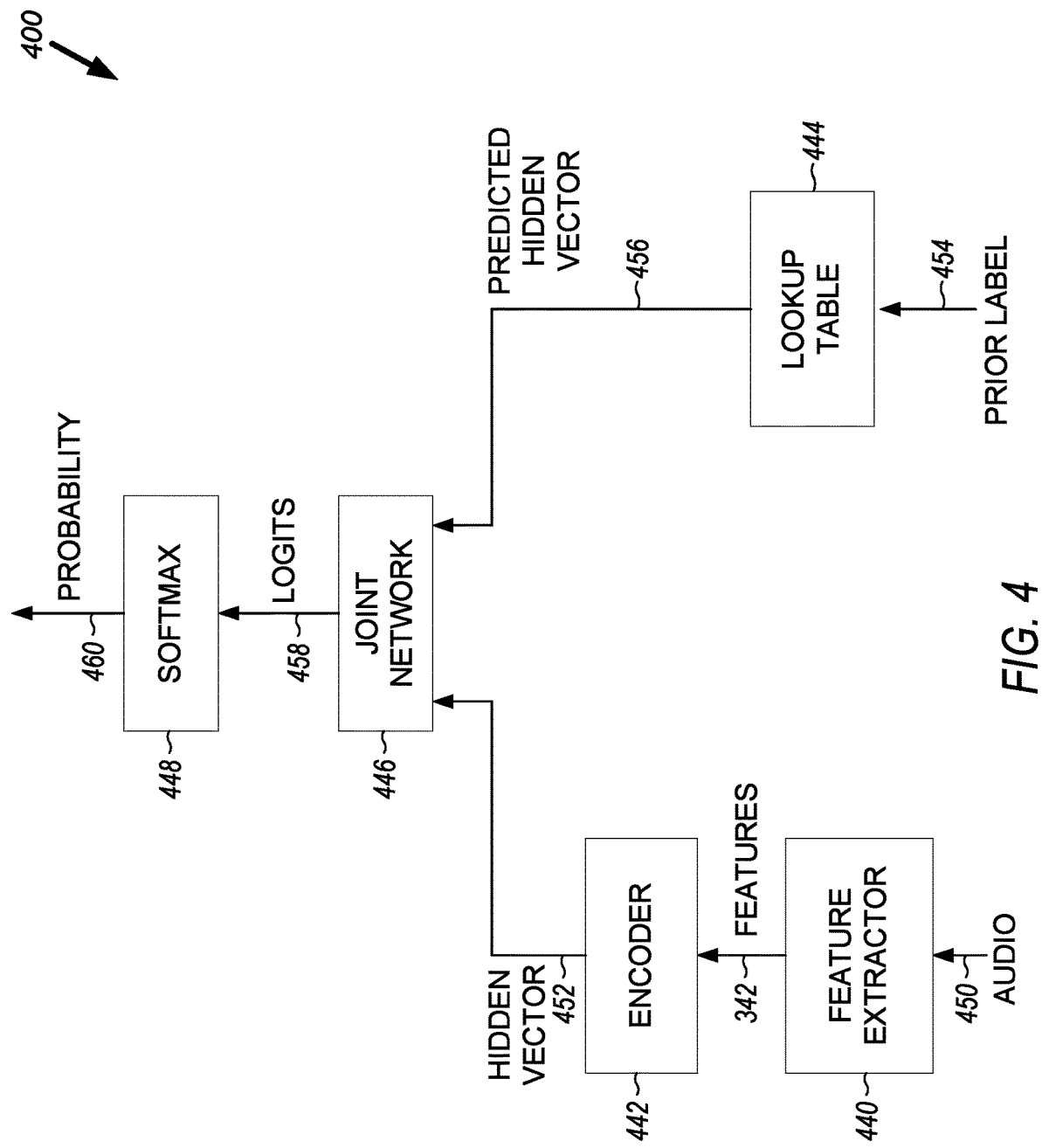
FIG. 4 illustrates, by way of example, a logical block diagram of an embodiment of a system for wake word verification.

FIG. 4 illustrates, by way of example, a diagram of an embodiment of a system 400 for wake word verification. The system 400 can be implemented by the wake word model engine 142. In some embodiments, the AM 330 and the LM 334 can be implemented using a recurrent neural network transducer (RNNT). The system 400 is sometimes called an RNNT. The system 400 as illustrated includes a feature extractor 440, encoder 442, lookup table (LUT) 444, joint network 446, and normalizer (e.g., softmax layer 448).

The feature extractor 440 receives sampled audio 450 and produces features 342 of the frame (usually 10-30 milliseconds per frame) of the audio 450. Example features include Mel frequency cepstral coefficients, linear predictive coding coefficients, perceptual linear prediction, relative spectrum transform analysis, and gammatone log energies. Many other features can be used. The feature helps characterize the content of the frames relative to one another by compactly modeling distinct portions of the sampled audio 450.

The encoder 442 receives the features 342 and provides a hidden vector 452. The encoder 442 acts as the AM 330 and the LM 334. An advantage of the system 40 is that output targets can be extracted from the system 400 in a streaming fashion. This is due, at least in part, to the system 400 operating on less than an entire encoded utterance.

The lookup table (LUT) 444 provides a predicted hidden vector 456 based on a previous label 454. The LUT 444 includes hidden vectors that correspond to outputs of layers of an NN that are biased to detecting the wake word. Examples of such NNs include a prediction network biased with attention, an autoencoder, a bidirectional gated recurrent unit (GRU), an LSTM, or the like. A prediction network is provided a most recent non-blank label as input and produces an output vector that corresponds to the predicted next label. The predicted next label is biased towards detecting the wake word in embodiments. This means that, given a phoneme present in the wake word, a next phoneme of the wake word can have a higher confidence of occurring than other phonemes.

The joint network 446 joins the two hidden vectors 452, 456 together and outputs the posterior of the predicted label from the LUT 444 and the hidden vector 452. The joint network 446 can comprise feed forward layers that compute logits 458 for every frame and label. The logits 458 can be converted to a probability distribution 460 over the labels by a softmax layer 448.

The system 400 of FIG. 4 can be used in place of the LM 334 and the AM 330 in FIG. 3. The systems 300, 400 are efficient (in terms of computational and memory efficiency) wake word spotting systems. The systems 300, 400 can check whether a segment of speech contains the wake word or not. Popular wake word spotting systems in products pre-define a wake word in and the user can only use that word to wake up the personal assistant (Cortana® with keyword "Cortana").

The wake word verification systems 300, 400 allow users or product developers to verify any wake word. Given a desired wake word, the wake word graph from the memory 160 or a corresponding wake word specific LUT 444 indicating the hidden vector given a previous label can be loaded into the wake word verifier 144. Then audio is passed through the decoding graph 332 with either the AM 330 and the LM 334, or the RNNT model with the LUT 444. The output can be provided to a beam search decoder 338 that produces a confidence score which shows how likely the audio contains the wake word. The confidence score is then compared with a predefined threshold to determine whether the wake word is present at operation 340.

Similar to the system 300 discussed previously, the NNs of the system 400 can be trained using whole word (WW) phonemes to model special words, like digits and letters or the wake word. Digits and letters are difficult to recognize in automatic speech recognition compared with common words. For these special words, specific phonemes can be used in place of standard phonemes to represent the pronunciations. These specific phonemes are sometimes called WW phones.

It can be advantageous to reduce the size and processing latency of the system 300, 400. The system 300, 400 can operate on the device 110, which can be memory or processing power limited. One way of reducing the memory overhead of the system 300, 400 is to use singular vector decomposition (SVD) on matrices (e.g., weight matrices) thereof. Using SVD reduces (compresses) the model size and computational cost while still retaining model accuracy after the compression.

In SVD, a single weight matrix is replaced with two weight matrices. This means that a single layer of the NN is replaced with two layers of the NN. The advantage of this, is that a single weight matrix can be replaced with two matrices that, in combination, include fewer parameters than the single weight matrix.

FIG. 5 depicts decomposing a weight matrix of an NN model into two matrices with smaller dimensions. A weight matrix A 610 is an m×n weight matrix in the NN model. Applying SVD to weight matrix A 610 produces $A_{m \times n} = U_{m \times n} \Sigma_{n \times n} V_{n \times n}^T$ (formula (1)) 320 where Σ is a diagonal matrix with A's singular values on the diagonal in the decreasing order. The m columns of U and the n columns of V are referred to as the left-singular vectors and right singular vectors of A, respectively. Since A is a sparse matrix, a large part of A's singular values are typically very small. Setting the small values to 0 does not considerably change the values of elements in matrix A.

Element 630 of FIG. 5 shows keeping the largest k singular values of A. Keeping the largest k singular values of A, formula (1) may be rewritten as $A_{m \times n} = U_{m \times k} \Sigma_{k \times k} V_{k \times n}^T$ as can be seen in element 640. This may further be represented as $A_{m \times n} = U_{m \times n} W_{k \times nk}$ where $W_{k \times nk} = \Sigma_{k \times k} V_{k \times n}^T$ as can be seen in element 350 that shows matrix A decomposed into two smaller matrices U and W.

As can be seen by referring to FIG. 5, the number of parameters changes from m*n in matrix A 610 to (m+n)k. The DNN model size is reduced when k is much smaller than m and n. The value of k can be set to a pre-decided value or determined using information from the weight matrices being reduced.

The LUT 444 can store pre-computed vectors from a prediction network (e.g., a wake word graph). The input of the prediction network can be the last predicted label (the prior label 454). When decoding, the prediction network and joint network 446 typically need to be recalculated for different result candidates. This increases the computational cost significantly. In the system 400, the decoding network is constrained to contain only the wake word, which means the input sequence of the prediction network is fixed for a given wake word. After the user decides the wake word 344, hidden vectors of the prediction network can be computed in and stored in the LUT 444. Instead of operating a prediction network, as previously done by others, the hidden vectors of a prediction network operating on the wake word 344 can be stored in the LUT 444. This saves significant computation and memory resources and allows more devices to perform wake word detection.

An RNN, such as an RNNT, operates based on current inputs and prior outputs. In the context of detecting a wake word, the history can cause the accuracy of the RNN to decrease. This is intuitively because whether the wake word 344 is present in an utterance now is independent of what was uttered a specified amount of time (e.g., five seconds, ten seconds, thirty seconds, one minute, greater or lesser time, or some amount of time therebetween) in the past.

To help retain accuracy of the RNN, the inputs to the RNN can be reset periodically (e.g., every five seconds, ten seconds, thirty seconds, one minute, greater or lesser time, or some amount of time therebetween). There is a small chance, that the reset can occur while the user 130 is uttering the wake word 344. Thus, a short rewind of the audio 450 can increase the accuracy and stability. The amount of rewind can be a maximum amount of time it takes the user 130 to utter the wake word 344 or other amount of time.

Another technique for reducing the size of the model and decreasing latency in identifying a wake word includes compressing the model with quantization, such as 8-bit or 16-bit quantization. The quantization can be applied to 32-bit floating point weights in the encoder 442 and joint network 446 matrices. This helps to compress the model size by about 4×. This compression reduces the amount of data that has to be read from main memory during execution in case the matrix weights are not already preloaded in central processing unit (CPU) cache. This helps increase the efficiency of vector-matrix multiplies of the on-chip processing elements in case the weights are already resident in the CPU cache. Many current hardware architectures implement multiply-add single instruction, multiple data (SIMD) operations, which can execute on registers of up to 256-bits. In case those registers contain 8-bit values, a single SIMD instruction can multiply and add 32 elements in a single cycle, 4 times more than if those registers contained 32-bit floating point values.

To preserve the NN accuracy and fully utilize the range of (−128,127), an asymmetrical range of the values of a single matrix row can be allowed, then compressed down to the target range allowed by the quantization. The quantized values can be stored to memory.

Figure 6:
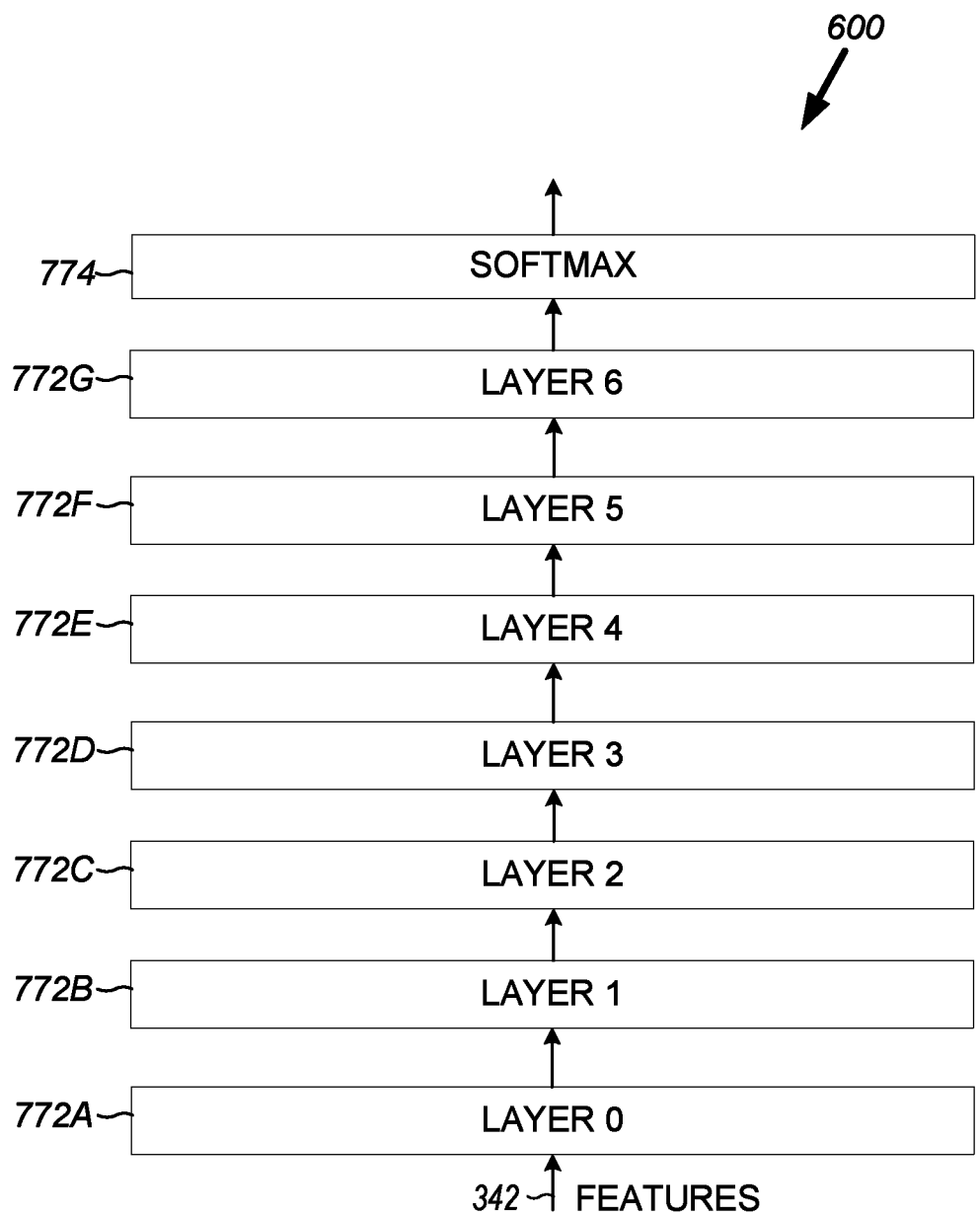
FIG. 6 illustrates, by way of example, a logical block diagram of an embodiment of a quantized NN.

FIG. 6 illustrates, by way of example, a diagram of an embodiment of a quantized NN 600. The NN 600 can be part of the AM 330, the encoder 442 or other part of a model. The NN 600 as illustrated includes seven quantized layers 772 and a softmax layer 774. The quantized layers 772A, 772B, 772C, 772D, 772E, 772F, 772G can be quantized to a same or different number range. In some embodiments, the quantized layers 772A and 772G are quantized to 16-bits and the quantized layers 772B, 772C, 772D, 772E, 772F are quantized to 8-bits. This configuration allows for a smaller model without giving up much accuracy.

Figure 7:
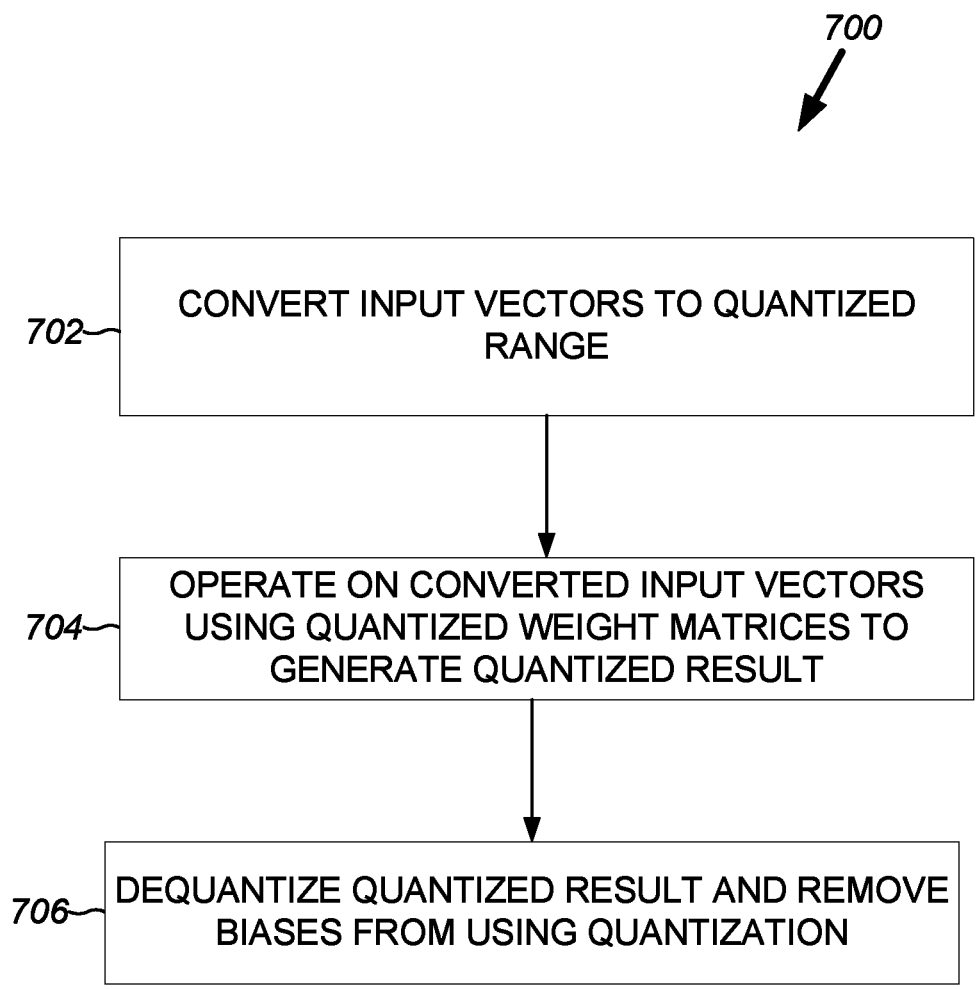
FIG. 7 illustrates, by way of example, a flow diagram of an embodiment of a method for using quantized matrices at runtime.

FIG. 7 illustrates, by way of example, a diagram of an embodiment of a method 700 for using quantized matrices at runtime. The method 700 as illustrated includes: converting input vectors to a quantized range (e.g., 8-bit, 16-bit, etc.), at operation 702; operating on the converted input vectors using a quantized weight matrix to generate quantized result, at operation 704; and dequantizing the quantized result and removing biases realized from using quantization, at operation 706. The operation 702 can be performed using a same asymmetrical quantization scheme used to quantize the weight matrices of the model. The operation 704 can be performed using SIMD instructions. The operation 706 can include converting the dequantized result to floating point (e.g., 32-bit, 64-bit, etc.).

Figure 8:
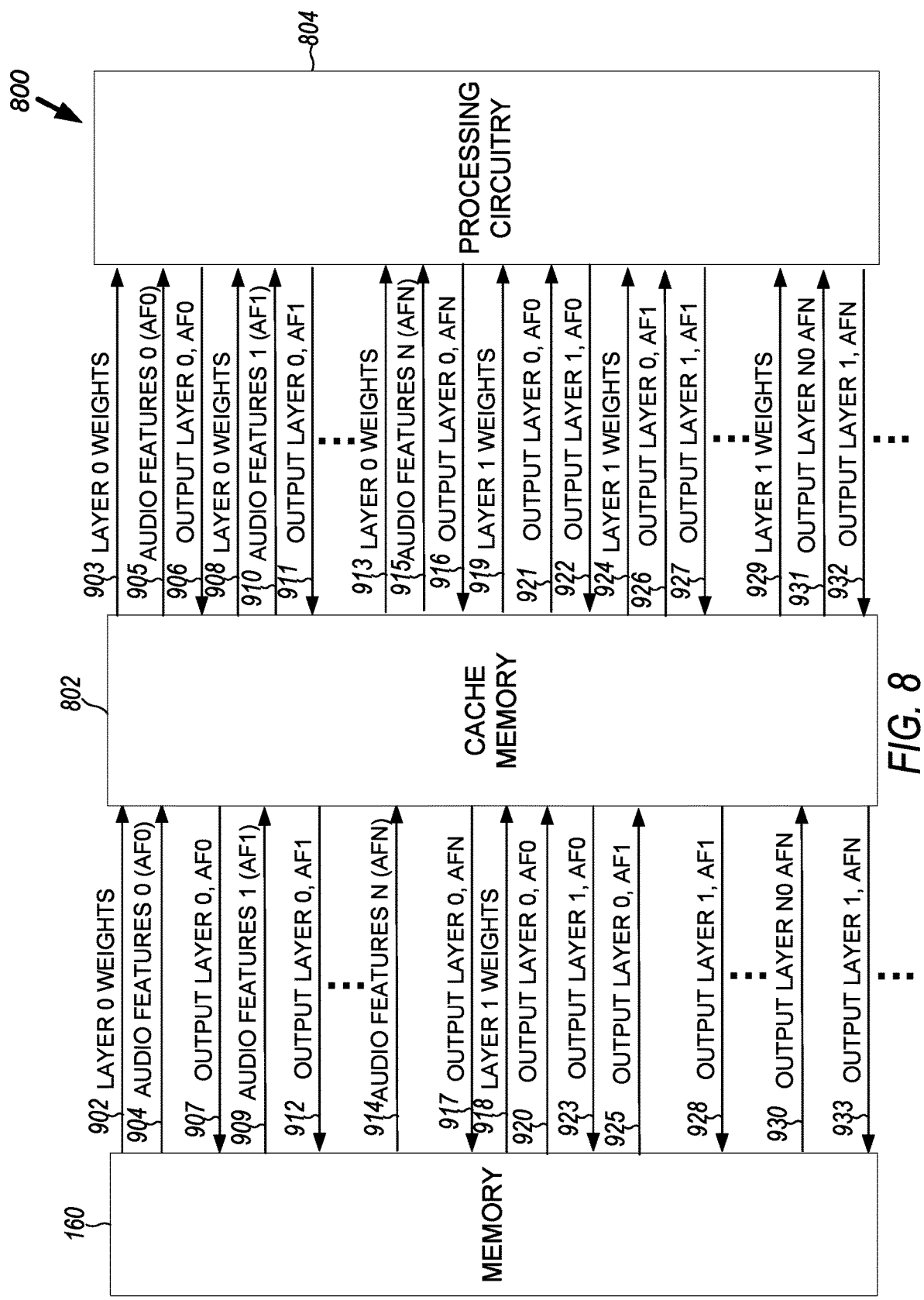
FIG. 8 illustrates, by way of example, a logical block diagram of an embodiment of a system configured for execution batching.

FIG. 8 illustrates, by way of example, a diagram of an embodiment of a system 800 configured for execution batching. The system 800 as illustrated includes the memory 160, processing circuitry 804, and a cache memory 802. The processing circuitry 804, the cache memory 802, and the memory 160 can be part of the wake word model engine 142. However, the operations performed by the system 800 can be implemented using the device 110. The operations illustrated in FIG. 8 can be performed in the order illustrated in FIG. 8, with some variation possible.

At operation 902, weights for a first layer of an NN can be loaded from the memory 160 into a cache memory 802. At operation 903, the weights for the first layer of the NN can be provided to the processing circuitry 804 for execution. At operation 904 first audio features from a first audio frame of an audio sample can be provided to the cache memory 802. At operation 905, the audio features from the first audio frame can be provided to the processing circuitry 804. The processing circuitry 804 can operate on the audio features using the NN configured using the layer weights provided at operation 903. The processing circuitry 804 can provide a corresponding output of the first layer based on the audio features from the first audio frame to the cache memory 802 at operation 906. At operation 907, the output of the first layer based on the first audio frame can be provided to the memory 160.

The process of operations 903-907 then repeats for a next audio frame at operations 908-912, and a next audio frame, until an $N^{th}$ audio frame is processed at operations 913-917. After N (N>1) audio frames have been processed by the first layer of the NN, weights for a second layer of the NN can be loaded from the memory 160 into the cache memory 802, at operation 918. Then the operations 903-917 can be repeated at operations 918-933, with the input being different and the weights of the layer or configuration of the layer being different. The input can be a respective output from the first layer (the immediately previous layer). The NN layer weights or configuration can be different.

An advantage provided by the technique of FIG. 8 can be provided by holding NN layer P parameters in CPU cache and processing data of multiple frames while parameters remain in cache. Consider a typical application in which layer 1 processes a first audio frame, then layer 2 processes the output of the layer 1, then layer 3 processes the output of the layer 2, and so on until layer P processes the output of layer P–1. This process then typically repeats for every single frame. In this process, the CPU loads from memory (the layer parameters) over and over again for every frame. Using the technique of FIG. 8, it takes only one memory access to load the memory into CPU cache for N audio frames, and instead reads from the CPU cache memory 802 to load the parameters. This is sometimes called execution batching. This process includes, instead of N*P memory accesses for parameters of N frames and P layers, there is only P memory accesses for the parameters. This provides significant runtime speed up as memory 160 access takes significantly longer than cache memory 802 access.

A variation in the order of operations discussed regarding FIG. 8 can include aggregating output of the first layer at the cache memory 802 and doing a batch write to the memory 160 (or not writing to the memory 160 if the cache memory 802 is sufficiently large). This can save time in by performing fewer write operations to the memory 160. Yet another variation in the order of operations discussed regarding FIG. 8 can include operating, using a next layer, on the outputs of a layer in a different order than the outputs were generated.

FIG. 9 illustrates, by way of example, a diagram of an embodiment of a beam search decoding trie 900 for the word "computer". Note how the beam search decoding trie 900 allows for multiple pronunciations of the same word. The trie 900 includes phonemes 880 and vectors 882 that are retrieved while traversing the trie 900. The alphabet of the trie 900 is composed of only the phonemes of the wake word 344, which is "computer" in the example of FIG. 9. The trie for different wake words is different and can be generated by a wake word decode graph generator 146 of the wake word model engine 142, such as offline.

Frame stacking includes providing features of multiple, consecutive frames as input to the wake word detection technique. The stacked frame includes audio features from multiple consecutive frames.

Frame skipping includes presenting only a subset of all frames as input to the wake word detection technique. When used with frame stacking, the knowledge of all frames can still be present, but with fewer operations performed by the wake word detection technique.

An advantage of embodiments includes leveraging a general automatic speech recognition (ASR) (e.g., universal acoustic model and language model) for wake word verification (WWV). Such a system reduces development effort as the ASR already exists. Further, using the WWV with the ASR improves the accuracy of the ASR. This is due, at least in part, to making the ASR recognize the phonemes of the wake word with fewer FAs and more CAs. These phonemes are very likely to occur in other words and will be more accurately detected by the WWV with ASR.

An advantage of embodiments includes single-pass (low latency) verification of a wake word. Further, embodiments can do a single-pass verification of multiple wake words. There is nothing that limits the number of wake words that can be chosen by the user 130. The components that might change to accommodate multiple wake words include the decoding graph 332 and the language model 334 (if the wake words are removed from the BLM.

After the wake word is verified as being detected, the remaining audio is analyzed to identify a task to be performed by the personal assistant 116. To save time, analyzing the audio to identify the task can be performed in parallel with detection of the wake word. If the wake word is not detected (immediately after a pre-determined amount of silence) analyzing the audio to identify the task can be halted and reset. In this fashion, detecting the wake word can add no latency to the task analysis.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

FIG. 10 illustrates, by way of example, a block diagram of an embodiment of a machine 1200 (e.g., a computer system) to implement one or more embodiments. One example machine 1200 (in the form of a computer), may include a processing unit 1202, memory 1203, removable storage 1210, and non-removable storage 1212. Although the example computing device is illustrated and described as machine 1200, the computing device may be in different forms in different embodiments. For example, the computing device may instead be a smartphone, a tablet, smartwatch, or other computing device including the same or similar elements as illustrated and described regarding FIG. 10. Devices such as smartphones, smart speakers, tablets, and smartwatches are generally collectively referred to as mobile devices. Further, although the various data storage elements are illustrated as part of the machine 1200, the storage may also or alternatively include cloud-based storage accessible via a network, such as the Internet.

Memory 1203 may include volatile memory 1214 and non-volatile memory 1208. The machine 1200 may include—or have access to a computing environment that includes—a variety of computer-readable media, such as volatile memory 1214 and non-volatile memory 1208, removable storage 1210 and non-removable storage 1212. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1200 may include or have access to a computing environment that includes input 1206, output 1204, and a communication connection 1216. Output 1204 may include a display device, such as a touchscreen, that also may serve as an input device. The input 1206 may include one or more of a touchscreen, touchpad, mouse, keyboard, camera, one or more device-specific buttons, one or more sensors integrated within or coupled via wired or wireless data connections to the machine 1200, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1202 (sometimes called processing circuitry) of the machine 1200. A hard drive, CD-ROM, and RAM are some examples of articles including a non-transitory computer-readable medium such as a storage device. For example, a computer program 1218 may be used to cause processing unit 1202 to perform one or more methods or algorithms described herein.

Processing circuitry includes electric or electronic components configured to perform operations of hardware, an application, or engine. The components can include a transistor, resistor, capacitor, diode, inductor, logic gate (e.g., AND, OR, XOR, negate, buffer, or the like), multiplexer, switch, oscillator, power supply, analog to digital converter, digital to analog converter, CPU, field programmable gate array (FPGA), application specific integrated circuit (ASIC), graphics processing unit, or the like.

ADDITIONAL NOTES AND EXAMPLES

Example 1 includes a system including memory including model parameters that define a wake word verification model, and processing circuitry to receive a message from a device indicating that an utterance of a wake word was detected at the device, the message including audio samples or features extracted from the audio samples and data indicating the wake word, execute wake word verification model to determine a likelihood that the wake word was uttered, and provide a message to the device indicating whether wake was uttered based on the determined likelihood.

In Example 2, Example 1 further includes, wherein the wake word verification model includes a prediction network that includes a decoding graph for only the wake word and a background language model (BLM).

In Example 3, Example 2 further includes, wherein the wake word is one of a plurality of wake words for the device and the decoding graph includes only the plurality of wake words and alternate pronunciations thereof.

In Example 4, at least one of Examples 2-3 further includes, wherein the wake word verification model further includes a general acoustic model that operates on the audio samples or the features extracted from the audio samples to predict a series of phonemes corresponding thereto.

In Example 5, at least one of Examples 3-4 further includes, wherein the acoustic model includes a plurality of neural network layers quantized to either 8 or 16-bits.

In Example 6, Example 5 further includes, wherein an input neural network layer and an output neural network layer of the neural network layers are quantized to 16-bits and the remaining neural network layers are quantized to 8-bits.

In Example 7, at least one of Examples 1-6 further includes, wherein the wake word verification model further includes a beam search decoder to determine, based on the predicated series of phonemes and a union of an output of the decoding graph and the BLM, a confidence that the wake word was uttered.

In Example 8, at least one of Examples 1-7 further includes, wherein the wake word verification model is to determine that the wake word is present only in response to determining that the wake word was predicted to be uttered in at least two intermediate hypotheses since the last silence.

In Example 9, at least one of Examples 1-8 further includes, wherein the processing circuitry is further to determine, in parallel, a task present in the audio samples or features extracted from the audio samples.

Example 10 includes a method of wake word verification consistent with the teaching of this disclosure.

Example 11 includes a non-transitory machine-readable medium including instructions that, when executed by a machine, cause the machine to perform operations of wake word verification consistent with the teaching this disclosure.

Example 12 includes means for performing the method of Example 10.

The operations, functions, or algorithms described herein may be implemented in software in some embodiments. The software may include computer executable instructions stored on computer or other machine-readable media or storage medium, such as one or more non-transitory memories (e.g., a non-transitory machine-readable medium) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

NNs are computational structures that are loosely modeled on biological neurons. Generally, NNs encode information (e.g., data or decision making) via weighted connections (e.g., synapses) between nodes (e.g., neurons). Modern NNs are foundational to many machine learning applications.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The correct operation of most NNs relies on accurate weights. However, NN designers do not generally know which weights will work for a given application. Instead, a training process is used to arrive at appropriate weights. NN designers typically choose a number of neuron layers or specific connections between layers including circular connection. Instead, a training process generally proceeds by selecting initial weights, which may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc. For machine learning of the intent, a supervised technique can be employed.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A system comprising:
   memory having stored model parameters that define a static portion of a wake word verification model; and
   processing circuitry to:
   receive a first message from a device indicating that an utterance of a user-defined wake word was detected at the device, the message including (a) audio samples or features extracted from the audio samples and (b) data indicating the user-defined wake word;
   retrieve or generate a custom decoding graph that decodes for the user-defined wake word, wherein the custom decoding graph and the static portion of the wake word verification model form a custom wake word verification model for the user-defined wake word, the custom wake word verification model including, in parallel, the custom decoding graph, a background language model (BLM), and an acoustic model, the acoustic model receives audio features and generates likelihood vectors that the audio features correspond to phonemes, the custom decoding graph receives the user-defined wake word and generates a sequence of phonemes in the user-defined wake word, and the BLM receives the user-defined wake word and generates a probability of observing a next gram given previous grams;
   execute the custom wake word verification model to determine a likelihood that the wake word was uttered; and
   provide a second message to the device indicating whether wake was uttered based on the determined likelihood.

2. The system of claim 1, wherein the wake word is one of a plurality of wake words for the device and the decoding graph includes only the plurality of wake words and alternate pronunciations thereof.

3. The system of claim 1, wherein the acoustic model includes a plurality of neural network layers quantized to a specified number of bits.

4. The system of claim 3, wherein an input neural network layer and an output neural network layer of the neural network layers are quantized to 16-bits and the remaining neural network layers are quantized to 8-bits.

5. The system of claim 1, wherein the wake word verification model further includes a beam search decoder to determine, based on the predicted series of phonemes from the acoustic model, and a union of the sequence of phonemes in the user-defined wake word from the custom decoding graph, and the probability of observing a next gram given previous grams from the BLM, a confidence that the wake word was uttered.

6. The system of claim 1, wherein the wake word verification model is to determine that the wake word is present only in response to determining that the wake word was predicted to be uttered in at least two intermediate hypotheses since a last silence.

7. The system of claim 1, wherein the processing circuitry is further to determine, in parallel, a task present in the audio samples or features extracted from the audio samples.

8. A method of custom wake word verification comprising:
   receiving, at a server, a first message from a device indicating that an utterance of a user-defined wake word was detected at the device, the message including (a) audio samples or features extracted from the audio samples and (b) data indicating the user-defined wake word;
   retrieving or generating, at the server, a custom decoding graph that decodes for the user-defined wake word, wherein the custom decoding graph and a static portion of the wake word verification model form a custom wake word verification model for the user-defined wake word, the custom wake word verification model including, in parallel, the custom decoding graph, a background language model (BLM), and an acoustic model, the acoustic model receives audio features and generates likelihood vectors that the audio features correspond to phonemes, the custom decoding graph receives the user-defined wake word and generates a sequence of phonemes in the user-defined wake word, and the BLM receives the user-defined wake word and generates a probability of observing a next gram given previous grams;

executing the custom wake word verification model to determine a likelihood that the wake word was uttered; and providing a second message to the device indicating whether wake was uttered based on the determined likelihood.

9. The method of claim 8, wherein the user-specified wake word is one of a plurality of wake words for the device and the custom decoding graph includes only the plurality of wake words and alternate pronunciations thereof.

10. The method of claim 8, wherein the acoustic model includes a plurality of neural network layers quantized to a specified number of bits.

11. The method of claim 10, wherein an input neural network layer and an output neural network layer of the neural network layers are quantized to 16-bits and the remaining neural network layers are quantized to 8-bits.

12. A non-transitory machine-readable medium including instructions that, when executed by a machine, cause the machine to perform operations for custom wake word verification, the operations comprising:

receiving a first message from a device indicating that an utterance of a user-defined wake word was detected at the device, the message including (a) audio samples or features extracted from the audio samples and (b) data indicating the user-defined wake word;

retrieving or generating, at the server, a custom decoding graph for the user-defined wake word, wherein the custom decoding graph and a static portion of the wake word verification model form a custom wake word verification model for the user-defined wake word, the custom wake word verification model including, in parallel, the custom decoding graph, a background language model (BLM), and an acoustic model, the acoustic model receives audio features and generates likelihood vectors that the audio features correspond to phonemes, the custom decoding graph receives the user-defined wake word and generates a sequence of phonemes in the user-defined wake word, and the BLM receives the user-defined wake word and generates a probability of observing a next gram given previous grams;

executing the custom wake word verification model to determine a likelihood that the wake word was uttered; and providing a second message to the device indicating whether wake was uttered based on the determined likelihood.

13. The non-transitory machine-readable medium of claim 12, wherein the wake word verification model further includes a beam search decoder to determine, based on the predicted series of phonemes from the acoustic model, and a union of the sequence of phonemes in the user-defined wake word from the custom decoding graph and the probability of observing a next gram given previous grams from the BLM a confidence that the wake word was uttered.

14. The non-transitory machine-readable medium of claim 12, wherein the operations further include determining, in parallel, a task present in the audio samples or features extracted from the audio samples.

* * * * *